US006887303B2

(12) United States Patent
Hesse et al.

(10) Patent No.: US 6,887,303 B2
(45) Date of Patent: May 3, 2005

(54) DEVICE FOR CONTINUOUSLY HUMIDIFYING AND DEHUMIDIFYING FEED AIR

(75) Inventors: Thomas Hesse, Tamm (DE); Kurt Rapp, Eberdinge (DE); Burkhard Wagner, Oberteuringen (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 10/433,336

(22) PCT Filed: Nov. 21, 2001

(86) PCT No.: PCT/DE01/04397

§ 371 (c)(1), (2), (4) Date: Nov. 18, 2003

(87) PCT Pub. No.: WO02/44624

PCT Pub. Date: Jun. 6, 2002

(65) Prior Publication Data

US 2004/0099140 A1 May 27, 2004

(30) Foreign Application Priority Data

Dec. 1, 2000 (DE) ........................................ 100 59 910

(51) Int. Cl.[7] .......................... B01D 53/22; B01D 53/26

(52) U.S. Cl. ......................... 96/8; 95/52; 96/10; 96/118

(58) Field of Search ............................. 95/52, 91; 96/4, 96/8, 10, 118

(56) References Cited

U.S. PATENT DOCUMENTS

| | | | | |
|---|---|---|---|---|
| 2,433,741 A | | 2/1947 | Crawford | 183/2 |
| 3,064,952 A | | 8/1962 | Brown | 261/3 |
| 4,900,448 A | | 2/1990 | Bonne et al. | 210/637 |
| 4,915,838 A | | 4/1990 | Bonne et al. | 210/640 |
| 5,399,188 A | * | 3/1995 | Roberts | 95/52 |
| 5,575,835 A | * | 11/1996 | Bailey et al. | 96/7 |
| 5,665,146 A | * | 9/1997 | Mizobe | 96/7 |
| 5,876,486 A | * | 3/1999 | Steinwandel et al. | 95/44 |
| 6,036,746 A | | 3/2000 | Scovazzo et al. | 95/52 |
| 6,165,253 A | * | 12/2000 | Sirkar et al. | 96/6 |
| 2002/0053285 A1 | * | 5/2002 | Hallman | 95/52 |
| 2002/0139245 A1 | * | 10/2002 | Kesten et al. | 95/52 |

FOREIGN PATENT DOCUMENTS

| | | |
|---|---|---|
| DE | 69514564 | 10/1995 |
| DE | 19545335 | 6/1997 |
| DE | 19639965 | 4/1998 |
| DE | 19812960 | 11/1999 |
| EP | 0678321 | 10/1995 |
| JP | 02140535 | 5/1990 |
| JP | 05146627 | 6/1993 |
| JP | 07108127 | 4/1995 |
| JP | 11051421 | 2/1999 |
| WO | 9401204 | 1/1994 |
| WO | 9633378 | 10/1996 |

* cited by examiner

*Primary Examiner*—Robert H. Spitzer
(74) *Attorney, Agent, or Firm*—Davidson, Davidson & Kappel, LLC

(57) ABSTRACT

A device for continuously humidifying and dehumidifying feed air for a manufacturing process or a ventilation and air conditioning installation includes a membrane contactor having a membrane, the feed air being passed along one side of the membrane and a hygroscopic liquid being passed along another side of the membrane. A regenerator is provided for lowering the water content of the hygroscopic liquid. A metering device is provided for adding water to increase the water content of the hygroscopic liquid. A control device is connected to the metering device and to the regenerator, the control device being configured to control the water content of the hygroscopic liquid and enable a switching between humidification and dehumidification of the feed air as a function of the water vapor partial pressure difference between the feed air and the hygroscopic liquid. A heat exchanger is provided to cool the hygroscopic liquid as the hygroscopic liquid moves from the regenerator to the membrane contactor and at the same time to heat the hygroscopic liquid as the hygroscopic liquid moves from the membrane contactor to the regenerator.

22 Claims, 4 Drawing Sheets

DEVICE FOR CONTINUOUSLY HUMIDIFYING AND DEHUMIDIFYING FEED AIR

The invention relates to a device for continuously humidifying and dehumidifying the feed air for manufacturing processes and ventilation and air conditioning installations.

The compressed air used as feed air for manufacturing processes or ventilation and air conditioning installations is usually dried by means of fixed-bed adsorption or gas permeation. By contrast, in the treatment of natural gas or in the drying of gases used in the chemical industry, the dehumidification is carried out by means of absorption processes. This requires the use of absorption columns, which are predominantly operated with hygroscopic glycol solutions, e.g., polyethylene glycol or triethylene glycol, as absorber medium. Solutions of lithium chloride (Kathabar process) or other inorganic salt mixtures are used as absorber medium in particular applications. On account of the aseptic action of the salt solution, these media are preferably used for air conditioning in areas of sensitive hygiene (e.g., hospitals, the pharmaceutical industry, the food industry). Characteristics of these applications are often the desire for low dew points and high volumetric flow rates.

In air conditioning technology for comfort air conditioning and for most industrial manufacturing processes, a relatively high absolute humidity level is tolerated. For these applications, the most widespread technique used to set the desired atmospheric humidity is thermal treatment—cooling and condensation. The heat which is released during the cooling and condensation is dissipated by means of a refrigeration process. The cooled and dehumidified air often then has to be heated to the desired feed air temperature. In addition to the high energy required for cooling and heating, the formation of free water on the heat exchanger surface constitutes a further drawback. This water can cause considerable fouling problems in air conditioning systems. These problems are intensified still further if air circuit is a relatively highly closed circuit.

In industrial manufacturing processes which require high humidity in the air (e.g., painting installations with water-based paint), dehumidification with absorbers is advantageous with a view to the energy saving and microbiological impurity aspects.

However, a significant drawback of the use of absorber columns is the narrow working range within which they can operate reliably and efficiently. By way of example, it must be ensured that uniform contact between the air and the absorber medium is achieved over the entire exchange surface area. Moreover, short-circuit flows must be avoided. Furthermore, it is necessary to prevent liquid droplets from being discharged from the column and passing into the manufacturing area together with the feed air.

By way of example, spray towers are used in conventional systems for humidifying gas streams. In this case, first of all the gas stream is preheated, then the gas stream which is to be humidified is passed through the spray tower, the water being atomized in counter-current. A drawback of this arrangement is that liquid droplets are discharged from the spray tower and may pass into the manufacturing area together with the feed air. Furthermore, it is impossible to switch operation of the installation between humidification and dehumidification.

The prior art described above is explained in more detail by the documents cited below.

The abstract of JP 11051421 shows a structure comprising two membrane contactors with an absorber liquid circuit arranged between them. Feed air is humidified/dehumidified by one of the membrane contactors. Outgoing air is humidified/dehumidified in the other membrane contactor. In addition, heat can be introduced into the membrane contactor which is used as a regenerator and therefore indirectly also into the absorber liquid by heating the outgoing air by means of a heat exchanger.

JP 07108127 describes exclusively the dehumidification of air. This is done by means of a membrane with the air flowing on one side of it and an absorber liquid flowing on the other side of it. This liquid takes up excessive moisture and removes it from the region of the membrane. At another location of the absorber liquid circuit, the moisture is expelled again, to which end the liquid is heated.

The abstract to JP 02140535 describes a membrane contactor which is suitable for setting a predetermined humidity by means of an absorber liquid. The drawings show a system which is comparable to that of JP 07108127 but which appears to be suitable for both humidification and dehumidification.

JP abstract 05146627 describes a structure which is designed to be similar to abstract JP 11051421. In this case too, there is a circuit between two membrane contactors, exchanging moisture between two gas streams without any further devices.

WO 94/01204 describes a very general structure for purifying and humidifying/dehumidifying gases. In this case, a permeable membrane is used to remove the undesirable constituents. Moreover, the humidification or dehumidification takes place through this membrane by means of a hygroscopic liquid, since the membrane is also permeable to water vapor. The desired humidity is set by varying the moisture content of the hygroscopic liquid. For this purpose, the liquid is brought (heated or cooled) to a suitable temperature level and exposed to a stripper gas through a membrane, so that in the hygroscopic liquid a moisture content is established as a function of its temperature. Then, the hygroscopic liquid is brought (heated or cooled) back to its required temperature level. This disadvantageously also entails a very high level of outlay on apparatus and energy, since it must be possible to implement both considerable heating and considerable cooling in order to vary the moisture content in the hygroscopic liquid.

U.S. Pat. No. 3,064,952 does not use a membrane, but rather uses direct contact between the hygroscopic liquid and the air which is to be conditioned in order to transfer moisture between the media. The humidification/dehumidification of the feed air used in this case is effected by means of the quantity of hygroscopic solution which is passed through the humidifier/dehumidifier, as well as by means of the heat which is introduced/extracted. The heat which is introduced/extracted, in the technique described in U.S. Pat. No. 3,064,952, is managed exclusively by means of externally supplied temperature-control media.

WO 96/33378 shows air conditioning effected by devices with a similar structure to U.S. Pat. No. 3,064,952. In this case, a brine/pickle is likewise atomized in the air which is to be conditioned. However, in the structure shown in WO 96/33378 there are two virtually identical units which both operate in the same way. The two units are in contact with one another, since the brine is exchanged between the units through a heat exchanger. In addition, heat exchange takes place between the brines circulating in each of the units by means of a heat exchanger circuit which, in addition to a pump, also has a throttle for expanding and thereby cooling the heat-transfer liquid used. The heat exchangers therefore ensure that both structures operate similarly under comparable conditions.

In connection with the further general prior art, reference should also be made to U.S. Pat. No. 2,433,741, U.S. Pat. No. 6,036,746 and DE 195 45 335 A.

It is an object of the invention to provide a device for continuously humidifying and dehumidifying the feed air for manufacturing processes or ventilation and air conditioning installations which makes it possible to switch between humidification and dehumidification with little outlay on energy and with a compact design.

The invention provides an apparatus for continuously humidifying and dehumidifying feed air for a manufacturing process or a ventilation and air conditioning installation. The apparatus includes:

a membrane contactor including a membrane configured to have the feed air passed along one side of the membrane and a hygroscopic liquid passed along another side of the membrane;

a regenerator configured to lower a water content of the hygroscopic liquid;

a metering device configured to add water so as to increase the water content of the hygroscopic liquid;

a control device connected to the metering device and to the regenerator, the control device being configured to control the water content of the hygroscopic liquid so as to enable a switching between humidification and dehumidification of the feed air as a function of a water vapor partial pressure difference between the feed air and the hygroscopic liquid; and a heat exchanger configured to cool the hygroscopic liquid as the hygroscopic liquid moves from the regenerator to the membrane contactor and at the same time to heat the hydroscopic liquid as the hygroscopic liquid moves from the membrane contactor to the regenerator, the membrane contactor, the metering device, the regenerator and the heat exchanger being connected in a circuit for the hygroscopic liquid.

The invention also provides an apparatus for continuously humidifying and dehumidifying feed air for a manufacturing process or a ventilation and air conditioning installation. The apparatus includes:

a membrane contactor including a membrane configured to have the feed air passed along one side of the membrane and a hygroscopic liquid passed along another side of the membrane;

a metering device configured to add water so as to increase the water content of the hygroscopic liquid, the metering device and the membrane contactor being connected in a first circuit for the hygroscopic liquid;

a regenerator configured to lower a water content of the hygroscopic liquid, the regenerator being connected in a second circuit for the hygroscopic liquid;

a control device connected to the metering device and to the regenerator, the control device being configured to control the water content of the hygroscopic liquid so as to enable a switching between humidification and dehumidification of the feed air as a function of a water vapor partial pressure difference between the feed air and the hygroscopic liquid;

at least one first feed line configured to branch off a first partial stream from the hygroscopic liquid in the first circuit and feed the first partial stream into the second circuit;

at least one second feed line configured to branch off a second partial stream from the hygroscopic liquid in the second circuit and return the second partial stream to the first circuit; and a heat exchanger, the at least one first feed line and the at least one second feed line passing through the heat exchanger.

a membrane contactor with a membrane, it being possible for the feed air to be passed along one side of the membrane and for a hygroscopic liquid to be passed along the other side of the membrane;

a metering device for adding water in order to increase the water content of the hygroscopic liquid;

a regenerator for lowering the water content of the hygroscopic liquid;

a control device, which is connected to the metering device and the regenerator, for controlling the water content of the hygroscopic liquid, so that it is possible to switch between humidification and dehumidification of the feed air as a function of the water vapor partial pressure difference between feed air and hygroscopic liquid.

Continuous humidification and dehumidification of the feed air can be achieved by means of the membrane contactor which is in flow communication with the regenerator. With the device according to the invention, it is possible, without having to exchange the components, on the one hand to maintain continuous operation for humidification of feed air and on the other hand to maintain continuous operation for dehumidification of feed air, and also to switch between the two operating modes.

A partial pressure difference for the water content results between the hygroscopic liquid and the feed air as a function of the temperature and water content of the hygroscopic liquid and the feed air. The temperature and the water content of the hygroscopic liquid can be set by means of the control device. If the partial pressure of the water in the hygroscopic liquid is higher than the partial pressure of the water in the feed air, water is discharged from the hygroscopic liquid and as a result the feed air is humidified. On the other hand, if the partial pressure of the water in the hygroscopic liquid is lower than the partial pressure of the water in the feed air, the feed air is dehumidified. Therefore, it is possible to switch between humidification and dehumidification of the feed air by means of a control device for controlling the temperature and moisture content of the hygroscopic liquid.

During humidification, the regenerator can be switched off, since this does not require any regeneration of the hygroscopic liquid. Therefore, the result is a low energy consumption on the part of the device according to the invention.

In addition to these features, which are identical for both configurations of the invention, the following comments also apply to the two solutions according to the invention.

In an embodiment of the invention, the membrane contactor, the metering device for adding water and the regenerator are connected into a circuit for the hygroscopic liquid. It is advantageous for a heat exchanger through which the hygroscopic liquid is passed to be connected into the circuit. The heat exchanger can control the temperature of the hygroscopic liquid. The heat exchanger cools the hygroscopic liquid fed to the membrane contactor and in parallel therewith also heats the hygroscopic liquid fed to the regenerator.

The hygroscopic liquid is advantageously passed through the device according to the invention inside a circuit by means of a pump.

In another embodiment of the invention, there are two circuits for the hygroscopic liquid. The membrane contactor and the metering device for adding water are connected into the first circuit. The regenerator is connected into the second circuit. Therefore, for humidification of the feed air, the second circuit, which includes the regenerator, can be decoupled, since in this case there is no need to regenerate the hygroscopic liquid.

In the first circuit, there is at least one feed line, by means of which a partial stream can be branched off from the first circuit from the hygroscopic liquid and fed to the first circuit. Therefore, some of the hygroscopic liquid can be passed from one circuit into the other circuit through these feed lines.

These feed lines are advantageously passed through a heat exchanger. This heat exchanger heats the partial stream of the hygroscopic liquid passed from the first circuit to the second circuit. In parallel, the heat exchanger cools the partial stream of the hygroscopic liquid which is passed from the second circuit into the first circuit.

A further heat exchanger for controlling the temperature of the hygroscopic liquid is expediently connected upstream of the membrane contactor and/or upstream of the regenerator.

The membrane contactor is advantageously equipped with a microporous (pore width 0.1 $\mu$m–0.2 $\mu$m), hygrophobic membrane, e.g., polytetraflouroethylene, polypropylene, polyvinyl difluoride or polysulphone. The pores of the membrane are not wetted by the hygroscopic liquid and remain as far as possible filled with air. The significantly more rapid diffusion in air-filled pores results in a lower transfer resistance in hygrophobic membrane materials compared to hygrophilic membrane materials.

The membrane within the membrane contactor defines a controlled exchange area between the hygroscopic liquid and the feed air which is to be conditioned. This prevents phase dispersion of the hygroscopic liquid and of the feed air, allowing phase separation without gravity effects.

The membrane within the membrane contactor is advantageously designed as a hollow fiber and has the hygroscopic liquid flowing through it. The result is a large specific volume-related exchange surface area, in particular of 100 $m^2/m^3$ to 500 $m^2/m^3$. Furthermore, a compact structure can be achieved by designing the membrane as a hollow fiber.

The hygroscopic liquid is advantageously a highly concentrated aqueous solution of polyhydric alcohols, e.g., ethylene glycol or glycerol, or a highly concentrated aqueous salt solution of hygroscopic salts with a biocidal action, e.g., lithium chloride or Kathene. This prevents pathogenic micro-organisms from entering the feed air for the manufacturing process or for the ventilation and air conditioning installation during the humidification or dehumidification.

In an advantageous embodiment of the device according to the invention in ventilation ducts for the feed air for manufacturing processes or ventilation and air conditioning installations, in particular painting installations, the membrane contactor may comprise a multiplicity of hollow fibers. The hollow fibers are arranged within the ventilation duct in such a manner that the flow in the ventilation duct impinges on the hollow fibers at an angle of less than 90°, in particular of between 30° and 60°.

As a result of this arrangement of the hollow fiber modules within the ventilation duct which is favorable in terms of fluid dynamics, the feed air flows through a large area of the hollow fibers. As a result, the pressure loss of the flow in the ventilation duct is significantly reduced.

In an advantageous embodiment, the hollow fibers cover substantially the entire cross section of the ventilation duct.

The hollow fibers can expediently be combined in hollow fiber modules, making them easy to handle.

Further advantages of the device according to the invention include the following:

- retrofitting in existing ventilation ducts is possible,
- the high flexibility in the operational production sequence of manufacturing processes or ventilation and air conditioning installations, avoiding flooding or discharge of absorber solution with the air stream,
- the sterile humidification and dehumidification of the feed air,
- the elimination of the demisters which in conventional humidification with spray registers (e.g., a spray tower) filter out the droplets which are present in the feed air,
- there is no need to clean the scrubber,
- humidity and temperature control in one system becomes possible,
- the reheating of the feed air required with condensation dehumidification is eliminated,
- a compact design,
- the prevention of fouling problems, and
- reduced energy consumption.

The device according to the invention can advantageously be used in ventilation ducts of, for example, painting installations, hospitals, production rooms in the pharmaceutical or food industries.

BRIEF DESCRIPTION OF THE DRAWINGS

The invention is elaborated upon below based on exemplary embodiments with reference to drawings, in which.

DETAILED DESCRIPTION

Figure 1:
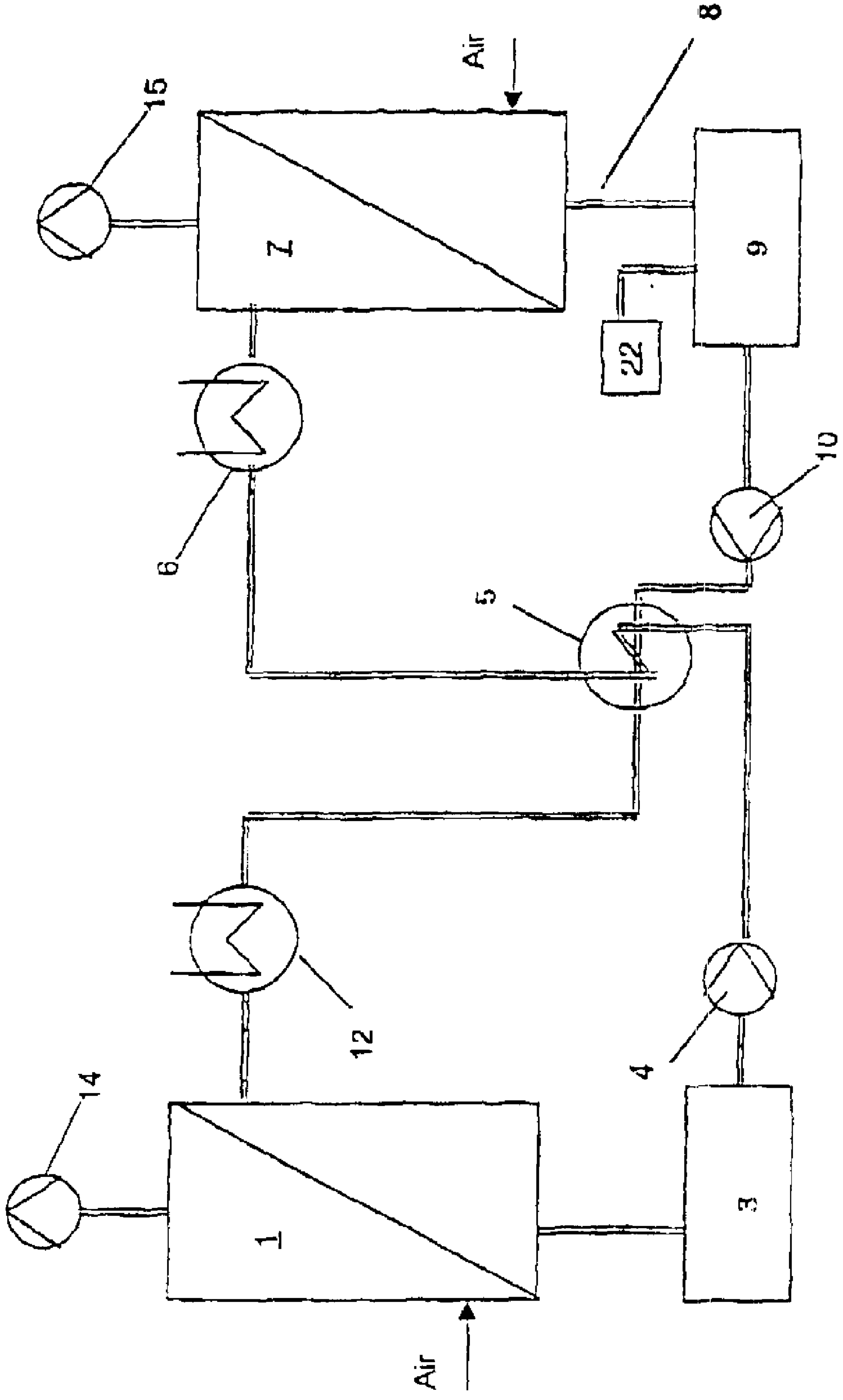
FIG. 1 shows a first exemplary embodiment of a device according to the invention for humidification and dehumidification with one circuit for the hygroscopic liquid.

In a first exemplary embodiment, FIG. 1 shows the device according to the invention for the humidification and dehumidification of feed air, the membrane contactor 1 and the regenerator 7 being connected in a common circuit. The regenerator 7 may, for example, be a membrane contactor, a packed column, an evaporator or a desorber.

In the membrane contactor 1, the feed air which is to be conditioned is brought into contact with the hygroscopic liquid. In the process, the feed air, e.g., fresh air or recirculated air, is passed through the membrane contactor 1 via one side of the membrane by means of a blower. The feed air and the hygroscopic liquid are separated by the membrane. A blower 14 finally carries the conditioned feed air out of the membrane contactor 1.

A buffer tank 3 for holding and storing the hygroscopic liquid is connected downstream of the membrane contractor 1. A pump 4 conveys the hygroscopic liquid out of the buffer tank 3 through an internal heat exchanger 5 and a heater 6 to the regenerator 7. The internal heat exchanger 5 and the heater 6 heat the hygroscopic liquid to the temperature required for regeneration in the regenerator 7. In this case, the heating medium used may, for example, be the waste heat from heating and power plants. The hygroscopic liquid is usually heated to a temperature of approx. 50° C.–70° C.

The heated hygroscopic liquid is atomized in the regenerator 7 in a column, for example a packed column, and brought into contact with the regeneration air, which is passed in countercurrent through the regenerator 7. The regeneration air takes up the water from the atomized hygroscopic liquid and is conveyed out of the regenerator 7 as waste air by means of a blower 15.

Alternatively, the regeneration of the hygroscopic liquid may take place in an evaporator in which the water vapor is expelled from the hygroscopic liquid. This represents a useful alternative if inexpensive superheated steam is available on account of the operationally specific boundary conditions.

The hygroscopic liquid, which has been concentrated as a result of the regeneration, passes into a further buffer tank 9 in the regenerator outlet 8. A pump 10 conveys the hygroscopic liquid from the buffer tank 9 through the internal heat exchanger 5 and a further heat exchanger 12 into the membrane contactor 1, with the result that the circuit is closed.

When the device according to the invention is operating for humidification of the feed air, water is added to the hygroscopic liquid. For this purpose, there is a metering device 22 which meters water into the buffer tank 9. The water may be metered exclusively into the buffer tank 3 or alternatively may be metered into both buffer tanks 3, 9. Furthermore, however, it is also possible for the water to be passed directly into the circuit instead of into a buffer tank.

Depending on the particular application of the device according to the invention, the heat exchanger 12 and the internal heat exchanger 5 are used for cooling or heating. In the case of humidification of the feed air, the hygroscopic liquid is preheated in the internal heat exchanger 5 and is heated to the appropriate entry temperature to the membrane contactor 1 in the heat exchanger 12. In the case of dehumidification, the internal heat exchanger 5 precools the hygroscopic liquid, and the heat exchanger 12 connected upstream of the membrane contactor 1 cools the hygroscopic liquid to the appropriate entry temperature to the membrane contactor 1. In this context, an appropriate entry temperature to the membrane contactor 1 is to be understood as meaning the temperature at which a partial pressure difference for the water content in the feed air and the hygroscopic liquid is set in such a manner that humidification or dehumidification of the feed air is possible according to the particular application.

The heat exchanger 12 may, for example, be operated with cooling tower water, surface water or well water, which optimizes energy efficiency.

This method variant for online regeneration is particularly advantageous if the recirculated air or fresh air fed to the membrane contactor 1 has a high humidity level.

Figure 2:
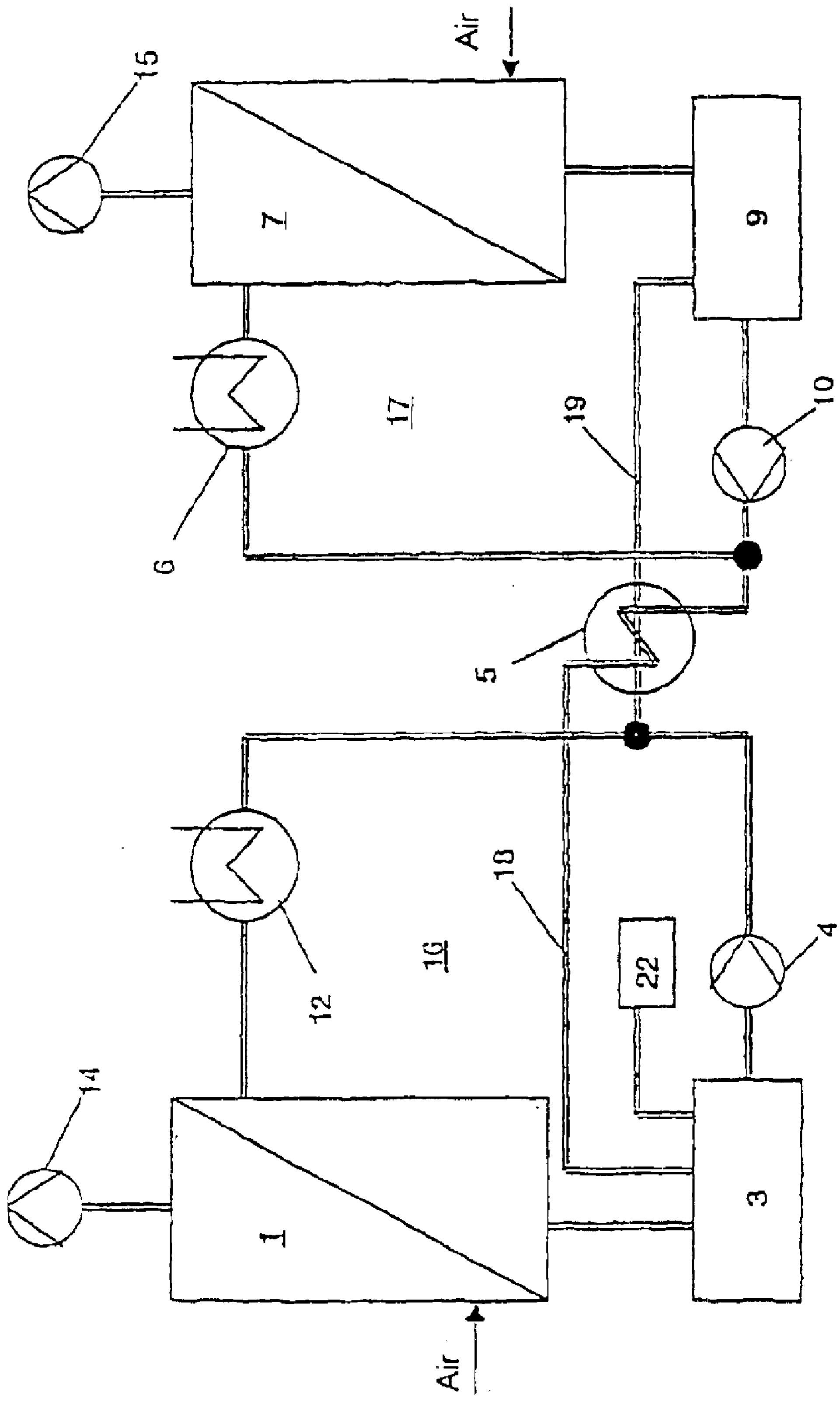
FIG. 2 shows a second exemplary embodiment of a device according to the invention for humidification and dehumidification, with two circuits for the hygroscopic liquid.

FIG. 2 shows a second embodiment of a process structure of the device according to the invention for the humidification and dehumidification of feed air, the membrane contactor 1 and the regenerator 7 being connected into two separate circuits, an absorber circuit 16 and a regenerator circuit 17. The two separate circuits are connected to one another by an internal heat exchanger 5. With the aid of measurement and control technology, it is possible to set the temperature, the volumetric flow and the concentration of the water content in the hygroscopic liquid separately in the absorber circuit 16 and in the regenerator circuit 17.

The air which is to be conditioned, e.g., fresh air or recirculated air, is passed through the membrane contactor 1 as described in the first exemplary embodiment.

In the absorber circuit 16, the hygroscopic liquid is pumped through the membrane contactor 1 by means of a pump 4. A buffer tank 3 and a heat exchanger 12 are connected downstream of the membrane contactor 1.

When the device according to the invention is operating for the purpose of dehumidification, the hygroscopic liquid has to be regenerated. For this purpose, there is a line 18 in the absorber circuit 16 which passes a partial stream of the hygroscopic liquid out of the absorber circuit 16 through an internal heat exchanger 5 into the buffer tank 9 of the regenerator circuit 17. At the same time, there is a further line 19 which passes a partial stream of the regenerated hygroscopic liquid out of the regenerator circuit 17 through the internal heat exchanger 5 into the buffer tank 3 of the absorber circuit 16.

The internal heat exchanger 5 is used on the one hand to preheat the hygroscopic liquid fed to the regenerator circuit 17. On the other hand, the heat exchanger 5 cools the hygroscopic liquid which is passed out of the regenerator circuit 17 into the absorber circuit 16.

In the regenerator circuit 17, a pump 10 conveys the hydroscropic liquid out of the buffer tank 9 through a heater 6 into the regenerator 7. In the regenerator 7, the hygroscopic liquid is atomized, as described in FIG. 1. The concentrated hygroscopic liquid then flows into the buffer tank 9, with the result that the regenerator circuit 17 is closed. The liquid-laden regeneration air is discharged from the regenerator 7 as waste air by means of a blower 15.

When the device according to the invention is operating for the purpose of humidifying the feed air, water is added to the hygroscopic liquid in the buffer tank 3 via a metering device 22. The hygroscopic liquid which has been diluted with water is heated to an appropriate entry temperature to the membrane contactor 1 in the heat exchanger 12 and is conveyed into the membrane contactor 1. In the membrane contactor 1, virtually all the water from the hygroscopic liquid is released to the feed air. Since there is no need to regenerate the hygroscopic liquid during the humidification operation, the regenerator 7 can be switched off.

Figure 3:
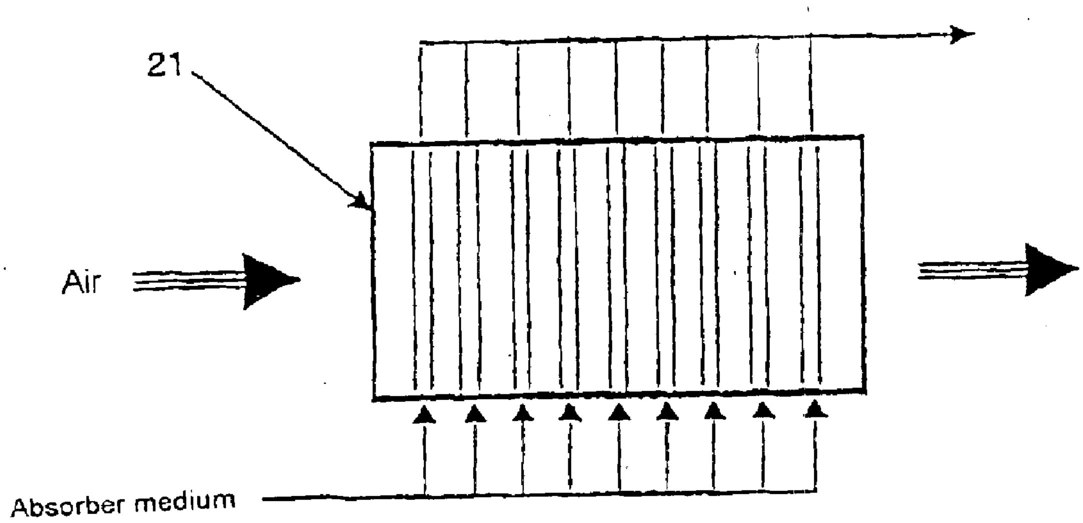
FIG. 3 shows the flow conditions in a membrane contactor, which is designed as a hollow fiber module, in cross current form.

FIG. 3 shows, by way of example, the flow conditions in a membrane contactor designed as a hollow fiber module in a cross-current arrangement. The hollow fiber module is distinguished by the fact that the microporous hydrophobic membrane is designed as a hollow fiber. Therefore, a multiplicity of individual hollow fibers are combined in a hollow fiber module, the hygroscopic liquid flowing through the hollow fibers on the lumen side (in the interior of the hollow fiber). The air which is to be conditioned is guided past the outer side of the membrane. In the cross-current arrangement illustrated, the air which is to be conditioned impinges vertically on the hollow fibers.

Figure 4:
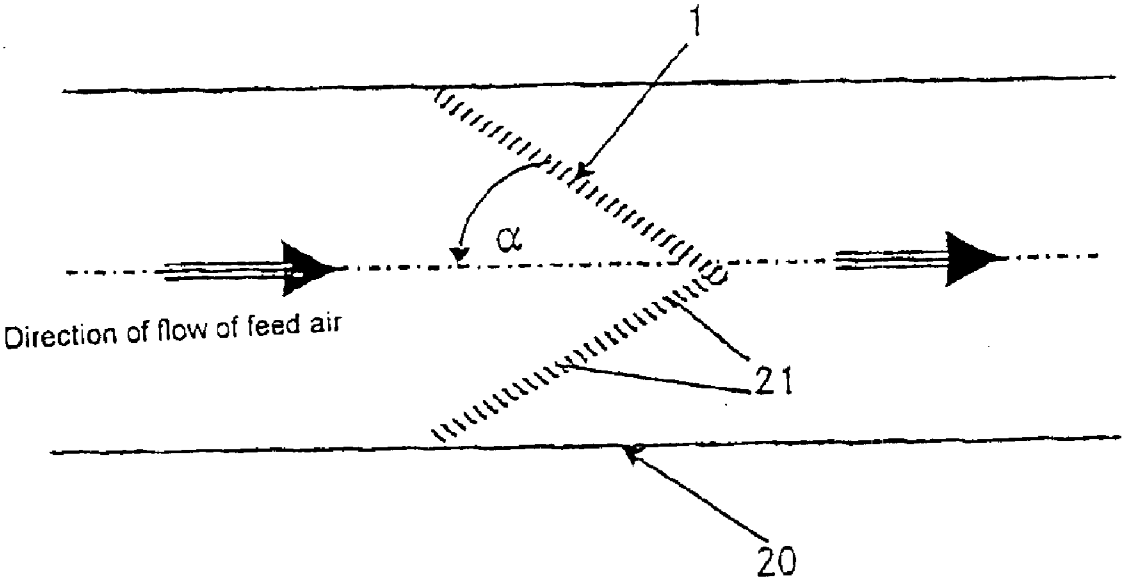
FIG. 4 shows a further exemplary embodiment of the device according to the invention, which is integrated in a ventilation duct.

FIG. 4 shows a further exemplary embodiment of the device according to the invention in a ventilation duct. In this case, the membrane contactor 1 fills up the area of the entire cross section of the ventilation duct 20. The membrane contactor 1 comprises a multiplicity of individual hollow fiber modules 21 which comprise a multiplicity of hollow fibers. These hollow fiber modules 21 are in turn connected to one another, so that the hygroscopic liquid in the hollow fibers is distributed over the entire cross section of the ventilation duct 20.

To reduce the flow resistance in the ventilation duct 20, the hollow fiber modules 21 are arranged in the ventilation duct 20 in a manner which is favorable in terms of fluid dynamics. The flow in the ventilation duct 20 in this case impinges on the hollow fiber modules 21 at an angle $\alpha$ of less than 90°, in particular between 30° and 60°. This arrangement ensures a greater area for fluid to flow through compared to an arrangement in which the fluid flows perpendicularly onto the surface of the hollow fiber modules 21. This firstly allows better exchange between the feed air and the hygroscopic liquid. Secondly, this arrangement reduces the pressure loss of the flow during flow through the hollow fiber modules 21.

The device according to the invention is particularly suitable for use in the conditioning of the feed air in a painting process in the automotive industry. In this application, it is necessary to maintain a predetermined painting operation window in terms of temperature and relative atmospheric humidity. The result of this is that in winter operation the outside air fed to the process has to be heated and humidified, while in summer conditions this outside air has to be cooled and dehumidified. This operation can be carried out by means of the dehumidification presented above by membrane absorption in combination with control of the air temperature.

Figure 5:
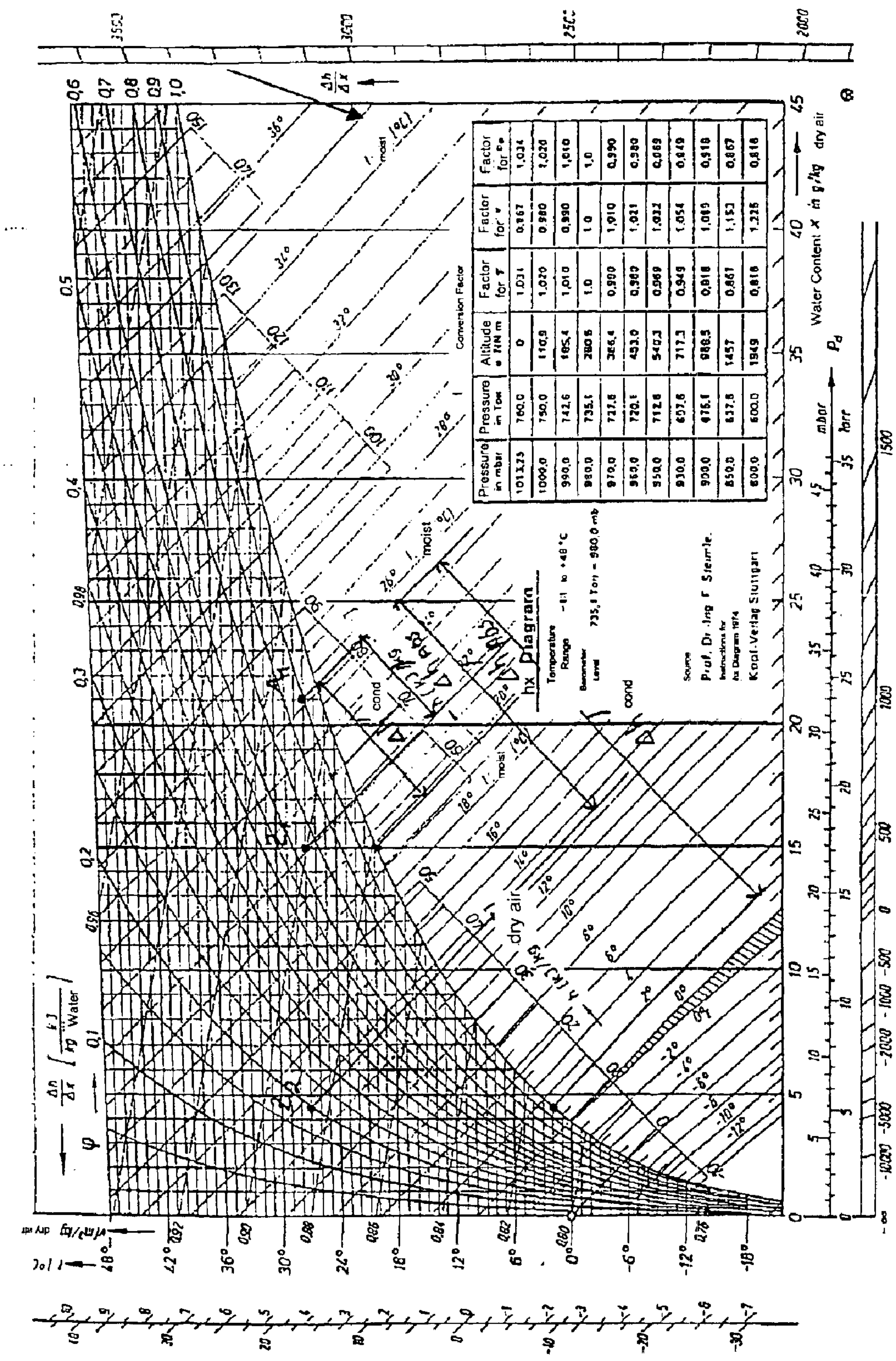
FIG. 5 shows a diagram illustrating the energy saving achieved by membrane absorption compared to condensation for an example of an application of the device according to the invention in a painting process.

FIG. 5 presents the process of dehumidification by means of condensation and the process of dehumidification by means of membrane absorption for a specific outside air state A and a predetermined target value Z for the feed air in the form of a Mollier hx diagram. State A and target value Z are given in the Mollier hx diagram for a defined temperature with a corresponding humidity. In the Mollier hx diagram, h denotes the enthalpy in kJ per kg of dry air and x denotes the water content in g per kg of dry air. $\phi$ denotes the relative humidity of the air in percent.

The energy saving which results from the dehumidification by means of membrane absorption compared to the dehumidification by means of condensation is explained on the basis of two examples.

EXAMPLE 1

| | |
|---|---|
| Outside air value $A_1$ at T = 27° C. | $x_{outside}$ = 20.6 g of $H_2O$/kg of dry air ($\phi$ = 90%) |
| | $h_{outside}$ = 79.5 kJ/kg |
| Target value $Z_1$ for feed air at T = 27° C. | $x_{target}$ = 14.7 g $H_2O$/kg of dry air ($\phi$ = 65%) |
| | $h_{target}$ = 63.6 kJ/kg |
| Required air quantity L | 150000 kg/h |

In the case of membrane absorption, to dehumidify the outside air the enthalpy difference between the enthalpy $h_{outside}$ of the outside air value $A_1$ and the enthalpy of the target value $Z_1$ of the feed air $h_{target}$ has to be consumed. This enthalpy difference $\Delta h_{abs}$, with the values given, is 15.9 kJ/kg. Combined with the required air quantity L, the result is an energy of 652.5 kW which is required to dehumidify the outside air to the predetermined target value $Z_1$ for the feed air.

In the case of dehumidification by condensation, the outside air firstly has to be cooled to a temperature $T_{dew}$ below the dew point. This corresponds to a temperature of 20° C. with the enthalpy $h_{dew}$=57.9 kJ/kg. The enthalpy difference $\Delta h_{cond}$ between the enthalpy of the outside air and the enthalpy when the temperature drops below the dew point is therefore 21.6 kJ/kg. In combination with the required air quantity L, therefore, the result is an energy of 900.0 kW being required to dehumidify the outside air to the predetermined target value $Z_1$ for the feed air by means of condensation.

This represents an energy savings of approx. 26%. This energy savings increases the lower the target humidity becomes.

EXAMPLE 2

| | |
|---|---|
| Outside air value $A_1$ at T = 27° C. | $x_{outside}$ = 20.6 g of $H_2O$/kg of dry air ($\phi$ = 90%) |
| | $h_{outside}$ = 79.5 kJ/kg |
| Target value $Z_2$ for feed air at T = 27° C. | $x_{target}$ = 4.47 g $H_2O$/kg of dry air ($\phi$ = 20%) |
| | $h_{target}$ = 38.4 kJ/kg |
| Required air quantity L | 150000 kg/h |

In the case of dehumidification by means of condensation, the outside air must firstly be cooled to $T_{dew}$=2° C., corresponding to an enthalpy $h_{dew}$ of 13.3 kJ/kg. With the required air quantity L and the enthalpy difference $\Delta h_{abs}$ of 66.2 kJ/kg between $h_{outside}$ and $h_{dew}$, this results in a required cooling energy of 2758.3 kW.

In the case of dehumidification by means of membrane absorption, this cooling energy is reduced to 1712.5 kW, resulting in an energy savings of approx. 38% compared to dehumidification by means of condensation.

What is claimed is:

1. An apparatus for continuously humidifying and dehumidifying feed air for a manufacturing process or a ventilation and air conditioning installation, the apparatus comprising:

a membrane contactor including a membrane configured to have the feed air passed along one side of the membrane and a hygroscopic liquid passed along another side of the membrane;

a regenerator configured to lower a water content of the hygroscopic liquid;

a metering device configured to add water so as to increase the water content of the hygroscopic liquid;

a control device connected to the metering device and to the regenerator, the control device being configured to control the water content of the hygroscopic liquid so as to enable a switching between humidification and dehumidification of the feed air as a function of a water vapor partial pressure difference between the feed air and the hygroscopic liquid; and a heat exchanger configured to cool the hygroscopic liquid as the hygroscopic liquid moves from the regenerator to the membrane contactor and at the same time to heat the hygroscopic liquid as the hygroscopic liquid moves from the membrane contactor to the regenerator, the membrane contactor, the metering device, the regenerator and the heat exchanger being connected in a circuit for the hygroscopic liquid.

2. The apparatus as recited in claim 1 wherein the membrane is microporous and hygrophobic.

3. The apparatus as recited in claim 1 wherein the membrane includes a hollow fiber configured for receiving a flow of the hygroscopic liquid therethrough.

4. The apparatus as recited in claim 1 wherein the regenerator includes at least one of a second membrane contactor, a packed column and an evaporator.

5. The apparatus as recited in claim 1 wherein the hygroscopic liquid includes at least one of a highly concentrated aqueous solution of a polyhydric alcohol and a highly concentrated aqueous salt solution of a hygroscopic salt with a biocidal action.

6. The apparatus as recited in claim 5 wherein the highly concentrated aqueous solution of the polyhydric alcohol includes at least one of ethylene glycol and glycerol.

7. The apparatus as recited in claim 5 wherein the highly concentrated aqueous salt solution of the hygroscopic salt includes at least one of lithium chloride and Kathene.

8. The apparatus as recited in claim 1 further comprising at least one of a second heat exchanger connected upstream of the membrane contactor and configured to control a first temperature of the hygroscopic liquid and a third heat exchanger connected upstream of the regenerator and configured to control a second temperature of the hygroscopic liquid.

9. The apparatus as recited in claim 1 wherein the membrane includes a plurality of hollow fibers disposed in a ventilation duct for the feed air, a flow in the ventilation duct impinging on the hollow fibers at an angle of less than 90°.

10. The apparatus as recited in claim 9 wherein the flow in the ventilation duct impinges on the hollow fibers at an angle of between 30° and 60°.

11. The apparatus as recited in claim 9 wherein the membrane contactor covers substantially an entire cross section of the ventilation duct.

12. An apparatus for continuously humidifying and dehumidifying feed air for a manufacturing process or a ventilation and air conditioning installation, the apparatus comprising:

a membrane contactor including a membrane configured to have the feed air passed along one side of the membrane and a hygroscopic liquid passed along another side of the membrane;

a metering device configured to add water so as to increase the water content of the hygroscopic liquid, the metering device and the membrane contactor being connected in a first circuit for the hygroscopic liquid;

a regenerator configured to lower a water content of the hygroscopic liquid, the regenerator being connected in a second circuit for the hygroscopic liquid;

a control device connected to the metering device and to the regenerator, the control device being configured to control the water content of the hygroscopic liquid so as to enable a switching between humidification and dehumidification of the feed air as a function of a water vapor partial pressure difference between the feed air and the hygroscopic liquid;

at least one first feed line configured to branch off a first partial stream from the hygroscopic liquid in the first circuit and feed the first partial stream into the second circuit;

at least one second feed line configured to branch off a second partial stream from the hygroscopic liquid in the second circuit and return the second partial stream to the first circuit; and a heat exchanger, the at least one first feed line and the at least one second feed line passing through the heat exchanger.

13. The apparatus as recited in claim 12 wherein the membrane is microporous and hygrophobic.

14. The apparatus as recited in claim 12 wherein the membrane includes a hollow fiber configured for receiving a flow of the hygroscopic liquid therethrough.

15. The apparatus as recited in claim 12 wherein the regenerator includes at least one of a second membrane contactor, a packed column and an evaporator.

16. The apparatus as recited in claim 12 wherein the hygroscopic liquid includes at least one of a highly concentrated aqueous solution of a polyhydric alcohol and a highly concentrated aqueous salt solution of a hygroscopic salt with a biocidal action.

17. The apparatus as recited in claim 16 wherein the highly concentrated aqueous solution of the polyhydric alcohol includes at least one of ethylene glycol and glycerol.

18. The apparatus as recited in claim 16 wherein the highly concentrated aqueous salt solution of the hygroscopic salt includes at least one of lithium chloride and Kathene.

19. The apparatus as recited in claim 12 further comprising at least one of a second heat exchanger connected upstream of the membrane contactor and configured to control a first temperature of the hygroscopic liquid and a third heat exchanger connected upstream of the regenerator and configured to control a second temperature of the hygroscopic liquid.

20. The apparatus as recited in claim 12 wherein the membrane includes a plurality of hollow fibers disposed in a ventilation duct for the feed air, a flow in the ventilation duct impinging on the hollow fibers at an angle of less than 90°.

21. The apparatus as recited in claim 20 wherein the flow in the ventilation duct impinges on the hollow fibers at an angle of between 30° and 60°.

22. The apparatus as recited in claim 20 wherein the membrane contactor covers substantially an entire cross section of the ventilation duct.

* * * * *

UNITED STATES PATENT AND TRADEMARK OFFICE
CERTIFICATE OF CORRECTION

PATENT NO. : 6,887,303 B2
DATED : May 3, 2005
INVENTOR(S) : Thomas Hesse, Kurt Rapp and Burkhard Wagner It is certified that error appears in the above-identified patent and that said Letters Patent is hereby corrected as shown below:

Title page,
Item [57], References Cited, U.S. PATENT DOCUMENTS, "3,064,952" reference date should be -- 11/1962. --.

Column 1,
Line 9, insert the heading -- BACKGROUND --.

Column 4,
Lines 4 to 18, should be deleted.

Column 10,
Line 25, should read -- $T_{dew} = 2°$ C, -- instead of "$T_{dew} = 2°$ C.,".

Signed and Sealed this

Sixth Day of September, 2005

JON W. DUDAS
*Director of the United States Patent and Trademark Office*